US011892790B2

(12) United States Patent
Tang

(10) Patent No.: US 11,892,790 B2
(45) Date of Patent: Feb. 6, 2024

(54) IMAGE FORMING APPARATUS AND ELECTRICAL EQUIPMENT

(71) Applicant: SHARP KABUSHIKI KAISHA, Sakai (JP)

(72) Inventor: Ming Tang, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/942,082

(22) Filed: Sep. 9, 2022

(65) Prior Publication Data

US 2023/0085853 A1 Mar. 23, 2023

(30) Foreign Application Priority Data

Sep. 17, 2021 (JP) ................................ 2021-152588

(51) Int. Cl.
*G03G 15/00* (2006.01)
*G03G 15/20* (2006.01)

(52) U.S. Cl.
CPC ..... *G03G 15/5004* (2013.01); *G03G 15/2014* (2013.01)

(58) Field of Classification Search
CPC ....................... G03G 15/5004; G03G 15/2014
See application file for complete search history.

(56) References Cited

U.S. PATENT DOCUMENTS 5,373,196 A * 12/1994 Faley ..................... H02J 9/062
307/64

FOREIGN PATENT DOCUMENTS

JP H06-236127 A 8/1994

* cited by examiner

*Primary Examiner* — Victor Verbitsky
(74) *Attorney, Agent, or Firm* — ScienBiziP, P.C.

(57) ABSTRACT

An image forming apparatus has an AC circuit having a heater and a triac for load control connected in series with the heater in order to control the heater. In addition, an image forming apparatus includes an overcurrent operation circuit connected in parallel with the AC circuit and through which a current flows in a state where DC power is suppliable to the AC circuit, and a polyswitch connected in series with the AC circuit and the overcurrent operation circuit, in which the polyswitch shuts off the current when an overcurrent flows in the overcurrent operation circuit.

7 Claims, 5 Drawing Sheets

IMAGE FORMING APPARATUS AND ELECTRICAL EQUIPMENT

BACKGROUND OF THE INVENTION

Field of the Invention

The present disclosure relates to an image forming apparatus and electrical equipment operated by an alternating current (AC) power source.

Description of the Background Art

Many types of electrical equipment are used by being connected to commercial power sources. Thus, the electrical equipment is configured to be driven by AC power sources. When direct current (DC) power is supplied to the electrical equipment as above, problems such as malfunction of or damage to components and the like driven by AC power may occur.

For example, since use of solar power generation has become widespread in recent years, AC power is supplied to the electrical equipment from a power conditioner for solar power generation that converts DC power obtained from power generation into AC power in some cases. In this case, there is a possibility of such nonconformity that the DC power is supplied to the electrical equipment when the AC power should have been supplied due to a failure of this power conditioner for solar power generation. If the nonconformity as above occurs, such nonconformity that components and the like driven by the AC power source may malfunction, be damaged or the like in the electrical equipment to which power is supplied from the power conditioner for solar power generation.

Here, the electrical equipment is a device that operates by electricity, such as household electrical machinery and appliances (home appliances), office equipment and the like. For example, image forming apparatuses such as copiers, facsimile machines, printers, and MFPs are also electric equipment. The image forming apparatus forms an image on a sheet by forming a toner image on the sheet by a photosensitive drum and by fixing this toner image on the sheet. This fixing is thermal fixing, which is performed by heating the toner image using a heater. In the image forming apparatus as above, the heater is connected in series with a triode for alternating current (triac) that controls an operation of the heater, a thermostat that protects the heater by shutting off an electric current to the heater when a temperature of the heater becomes high, a power relay that protects the heater by shutting off the electric current to the heater when abnormality of the power source is detected.

Here, the triac is one of three-terminal semiconductor switching elements, which is widely used as a switch for an AC current. Specifically, when a trigger pulse current is applied to a gate terminal of the triac, it is conducted (brought into an ON state), while it is shut off (brought into an OFF state) when a half cycle of the conducted AC is completed. In other words, when the trigger pulse current is applied to the gate terminal of the triac, it causes the ON state, and when the AC voltage applied to the triac becomes 0 V, it automatically causes the OFF state. As a result, the operation of the load connected to the triac can be easily controlled by controlling timing at which the trigger pulse current is applied. However, if a DC voltage is applied to the triac, it does not become 0 V and the OFF state is not brought about automatically, but the DC voltage is continuously applied to the triac.

For example, a conventional technology discloses a temperature control circuit that regulates a temperature of a heater by controlling the AC voltage of a commercial power source or the like to be applied to the heater, which is a load, by means of the triac, which is a switching element.

In the temperature control circuit disclosed in the conventional technology, if the voltage is continuously applied to the heater, a temperature rise of the heater does not stop, resulting in a nonconformity of an abnormal temperature rise. However, as described above, since the thermostat, the power relay and the like are connected to the heater, if they operate properly, the voltage supply to the heater is stopped, and the temperature rise of the heater can be stopped.

However, as described above, when the DC voltage is applied due to a failure or the like of the power conditioner for solar power generation, even if the contacts of the thermostat and the power relay are to be released, unlike the case where the AC voltage is applied, arc discharge occurs between the contacts, and the contacts are welded and cannot be disconnected and thus, there is a possibility that the thermostat and the power relay may remain in a short-circuited state. If the thermostat and the power relay remain short-circuited, the voltage is continuously applied to the heater, and the temperature rise of the heater does not stop, resulting in damage to each component and a failure. In addition, there is also a possibility that the heater and the like may catch fire, causing serious accidents.

The present disclosure is an invention made in view of the aforementioned circumstances, and an object thereof is to provide an image forming apparatus and electrical equipment that can suppress damage to each component in the image forming apparatus and the electrical equipment operated by an AC power source, even when the supplied AC power source is switched to a DC power source.

SUMMARY OF THE INVENTION

The electrical equipment according to one aspect of the present disclosure is electrical equipment including an AC circuit having a load and a load control member connected in series with the load in order to control the load, in which an overcurrent operation circuit connected in parallel with the AC circuit and through which a current flows in a state where DC power is suppliable to the AC circuit, and an overcurrent breaker connected in series with the AC circuit and the overcurrent operation circuit are provided, characterized in that the overcurrent breaker shuts off the current when an overcurrent flows in the overcurrent operation circuit.

As a result, when the DC power is supplied to the load that is normally operated by the AC power source, an overcurrent flows to the overcurrent operation circuit connected in parallel with the AC circuit including the load, which causes the overcurrent breaker to operate, thereby an input to the load is shut off. Therefore, if the input to the load is not shut off, the load control member cannot control the load due to the input of the direct current, and there is a possibility of the load malfunctions, but since the overcurrent breaker shuts off the input to the load, the load malfunction can be suppressed. Therefore, nonconformities such as failures and the like caused by the load malfunction can be prevented.

In the electrical equipment described above, the overcurrent operation circuit may also have a current-limiting resistor having a resistance value lower than the load and a DC power operation supplier that is connected in series with the current-limiting resistor and is electrically conducted in a state where the DC power is suppliable to the AC circuit.

As a result, when the DC power operation supplier is electrically conducted by the supply of the DC power, a circuit in which the overcurrent operation circuit and the AC circuit are connected in parallel is formed, but since the current limiting resistor of the overcurrent operation circuit has a resistance value lower than the load of the AC circuit, the current flows mainly in the overcurrent operation circuit and the overcurrent is generated, whereby the overcurrent breaker is operated. As described above, when the DC power is supplied, the overcurrent breaker promptly operates and shuts off the input to the load, whereby nonconformities caused by the load malfunction can be prevented.

In the electrical equipment described above, the DC power operation supplier may be a triac that is turned on in a state where the DC power is suppliable to the AC circuit.

As a result, the DC power operation supplier that is electrically conducted (turned on) in a state where the DC power is suppliable to the AC circuit can be easily configured.

In the electrical equipment described above, the load may be a heater that forms an image on a recording medium by thermally fixing a toner image formed on the recording medium.

As described above, when the load is a heater, there is a nonconformity that, if the input to the heater is not stopped, the heater will continue to generate heat and eventually catch fire, but when the DC power is supplied, the overcurrent breaker is operated and shuts off the input to the heater and thus, the heater stops and cannot continue to generate heat, whereby the nonconformity and the like can be suppressed.

Moreover, the image forming apparatus according to an aspect of the present disclosure is an image forming apparatus that forms a toner image on a recording medium and forms an image on the recording medium by fixing the toner image formed on the recording medium, including an AC circuit having a heater, which is a load that thermally fixes the toner image formed on the recording medium, and a load control member connected in series with the heater in order to control the heater, an overcurrent operation circuit connected in parallel with the AC circuit and through which a current flows in a state where a DC power is suppliable to the AC circuit, and an overcurrent breaker connected in series with the AC circuit and the overcurrent operation circuit, characterized in that the overcurrent breaker shuts off the current by the flow of an overcurrent through the overcurrent operation circuit.

As a result, when the DC power is supplied to the heater for thermally fixing the toner image of the image forming apparatus that is normally operated by the AC power source, an overcurrent flows to the overcurrent operation circuit connected in parallel with the AC circuit including the heater, which causes the overcurrent breaker to operate, thereby an input to the heater is shut off. Therefore, if the input to the heater is not shut off, the load control member cannot control the heater anymore due to the input of the direct current, and the heater would continue to generate heat, but since the overcurrent breaker shuts off the input to the load, the heat generation of the heater can be stopped. Therefore, nonconformities such that the heater continues to generate heat and catches fire or the like can be prevented.

According to the present disclosure, in the image forming apparatus and the electrical equipment operated by the AC power source, damage of each component can be suppressed even when the supplied AC power is switched to the DC power.

DESCRIPTION OF THE PREFERRED EMBODIMENTS

An embodiment of the present disclosure will be described with reference to the drawings.

Embodiment

Figure 1:
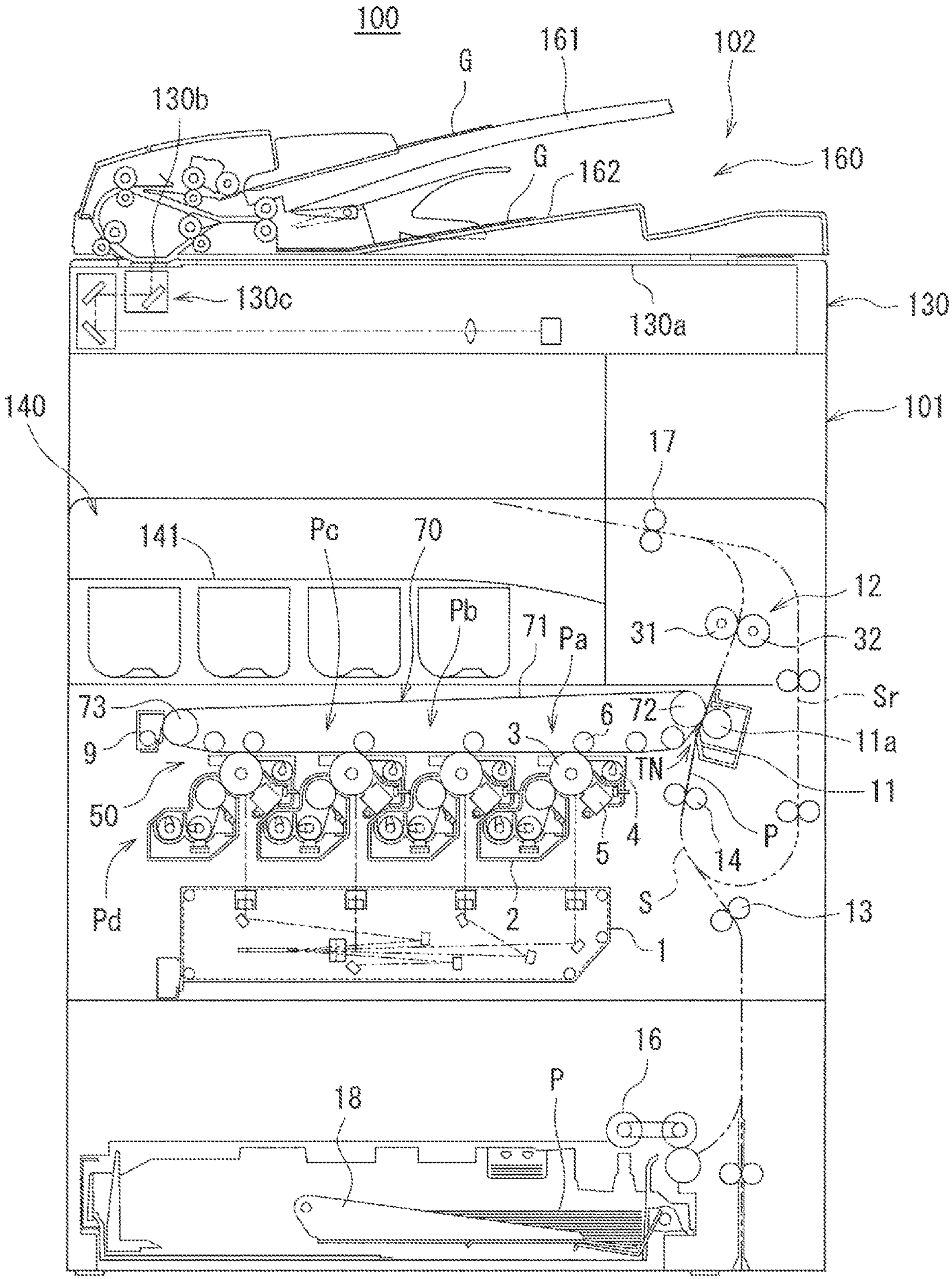
FIG. 1 is a front view illustrating schematic configuration of an image forming apparatus according to an embodiment of the present disclosure in a perspective manner.

An image forming apparatus according to an embodiment of the present disclosure will be described with reference to the drawings. FIG. 1 is a front view illustrating schematic configuration of the image forming apparatus according to an embodiment of the present disclosure in a perspective manner.

An image forming apparatus 100, which is electrical equipment, is a multifunctional machine having a copying function, a scanner function, a facsimile function, and a printer function and transmits an image of a document G read by an image reading device 102 to outside. The image forming apparatus 100 forms an image of the document G read by the image reading device 102 or an image received from an external source on paper P or other sheets in color or monochrome.

On an upper side of an image reader 130, a document feeder 160 (automatic document feeder (ADF)) supported capable of being opened/closed with respect to the image reader 130 is provided. The image reading device 102 includes the document feeder 160. The document feeder 160 conveys a single or a plurality of documents G sequentially one by one. The image reading device 102 reads the document G in the single or plurality of documents G sequentially conveyed one by one by the document feeder 160. The image reading device 102 includes a document loading table 130*a* on which the document G is loaded and a loaded document reading function that reads the document G loaded on the document loading table 130*a*. The image forming apparatus 100 is configured such that, when the document feeder 160 is opened, the document loading table 130*a* above the image reader 130 is opened so that the document G can be placed by hand. The document feeder 160 includes a document loading tray 161 on which the document G is loaded and a document ejection tray 162 on which the document G ejected to the outside is loaded. The image reading device 102 includes a conveyed document reading function that reads the document G conveyed by the document feeder 160. The document feeder 160 conveys the document G loaded on the document loading tray 161 onto a document reader 130*b* in the image reader 130. The image reader 130 scans the document loaded on the document loading table 130*a* with a scanning optical system 130*c* or reads the document G conveyed by the document feeder 160 and generates image data.

An image forming apparatus main-body 101 includes an image transferor 50, an optical scanning device 1, an intermediate transfer belt device 70, a secondary transfer device 11, a fixing device 12, a sheet conveyance path S, a paper feed cassette 18, and a sheet ejection tray 141.

In the image forming apparatus 100, image data according to color images using each color of black (K), cyan (C), magenta (M), and yellow (Y), or monochrome images using a single color (black, for example).

The image transferor 50 of the image forming apparatus 100 has four image stations Pa, Pb, Pc, Pd corresponding to each of the black, cyan, magenta, and yellow colors. Each of these imaging stations Pa, Pb, Pc, Pd includes a developing device 2, a photosensitive drum 3, a drum cleaning device 4, and a charger 5, and these image stations Pa, Pb, Pc, Pd form four types of toner images. In other words, the developing device 2, the photosensitive drum 3, the drum cleaning device 4, and the charger 5 are provided four each, and they correspond to black, cyan, magenta, and yellow, respectively.

The optical scanning device 1 exposes a surface of the photosensitive drum 3 to light and forms an electrostatic latent image. The developing device 2 develops the electrostatic latent image on the surface of the photosensitive drum 3 and forms a toner image on a surface of the photosensitive drum 3. The drum cleaning device 4 removes and collects residual toner from the surface of the photosensitive drum 3. The charger 5 uniformly charges the surface of the photosensitive drum 3 to a predetermined potential. By means of a series of operations described above, toner images in the respective colors are formed on the surfaces of the respective photosensitive drums 3.

The intermediate transfer belt device 70 includes an intermediate transfer roller 6, an endless intermediate transfer belt 71, an intermediate transfer drive roller 72, an intermediate transfer driven roller 73, and a cleaning device 9. The Intermediate transfer belt 71 is an endless belt, capable of circumferential movement, and is wound around the intermediate transfer drive roller 72 and the intermediate transfer driven roller 73. In other words, the intermediate transfer drive roller 72 and the intermediate transfer driven roller 73 tension the intermediate transfer belt 71. Four intermediate transfer rollers 6 are disposed inside the intermediate transfer belt 71 so as to form four different toner images corresponding to the respective colors. The intermediate transfer roller 6 transfers the toner image in each color formed on the surfaces of the photosensitive drums 3 to the intermediate transfer belt 71.

The image forming apparatus 100 sequentially transfers and superimposes the toner images in each color formed on the surface of each photosensitive drum 3 and forms a color toner image on the surface of the intermediate transfer belt 71 extended between the intermediate transfer drive roller 72 and the intermediate transfer driven roller 73. The cleaning device 9 removes and collects waste toner that remains on the surface of the intermediate transfer belt 71 without having been transferred to the sheet P.

The secondary transfer device 11 forms a transfer nip region TN between a secondary transfer roller 11*a* and the intermediate transfer belt 71 and conveys the sheet P having been conveyed through the sheet conveyance path S by sandwiching it in the transfer nip region TN. When the sheet P passes through the transfer nip region TN, the toner image on the surface of the intermediate transfer belt 71 is transferred onto the sheet P, and the sheet P is conveyed to the fixing device 12.

The fixing device 12 includes a fixing roller 31 and a pressure roller 32 that rotate while sandwiching the sheet P. The fixing device 12 sandwiches, between the fixing roller 31 and the pressure roller 32, the sheet P on which the toner image has been transferred, heats and pressurizes the sheet P, and fixes the toner image to the sheet P. Specifically, a heater 36 (see FIG. 3), which is a heat source, is disposed inside the fixing roller 31, and heat generation of the heater 36 heats the surface of the fixing roller 31 that contacts the sheet P onto which the toner image has been transferred.

The paper feed cassette 18 is a cassette that stores sheets P used for image formation and is disposed under the optical scanning device 1. The sheet P is pulled out of the paper feed cassette 18 by a pickup roller 16 and is conveyed to the sheet conveyance path S. The sheet P having been conveyed to the sheet conveyance path S is conveyed to an ejection roller 17 via the secondary transfer device 11 and the fixing device 12, and ejected to the sheet ejection tray 141 in an ejector 140. A conveyance roller 13, a resist roller 14, and the ejection roller 17 are disposed on the sheet conveyance path S. The conveyance roller 13 promotes conveyance of the sheet P. The resist roller 14 temporarily stops the sheet P and aligns a leading edge of the sheet P. The resist roller 14 conveys the sheet P, which is once stopped, in timing with a color toner image on the intermediate transfer belt 71. The color toner image on the intermediate transfer belt 71 is transferred to the sheet P in the transfer nip region TN between the intermediate transfer belt 71 and the secondary transfer roller 11*a*.

Although the number of paper feed cassettes 18 is one in FIG. 1, this is not limiting, and it may be so configured that a plurality of the paper feed cassettes 18 are provided so as to load different types of sheets P.

When an image is formed on a back side of the sheet P as well as a front side thereof, the image forming apparatus 100 conveys the sheet P in an opposite direction from the ejection roller 17 to a sheet reversal path Sr. The image forming apparatus 100 reverses the front and back of the sheet P conveyed in the opposite direction and leads it again to the resist roller 14. The image forming apparatus 100 also forms an image on the back side of the sheet P led to the resist roller 14 in the same manner as the front side, and then carries the sheet P out to the sheet ejection tray 141.

Here, the image forming apparatus 100 is generally used by being connected to a commercial power source. In other words, the image forming apparatus 100 is driven by an AC power source. If DC power is supplied to the image forming apparatus 100, there is a possibility that the apparatus is not driven normally and causes a failure and the like.

Next, a control operation of the fixing device 12 in the image forming apparatus 100 will be described with reference to the drawings. In particular, the control operation of the heater 36 of the fixing device 12 will be explained.

Figure 2:
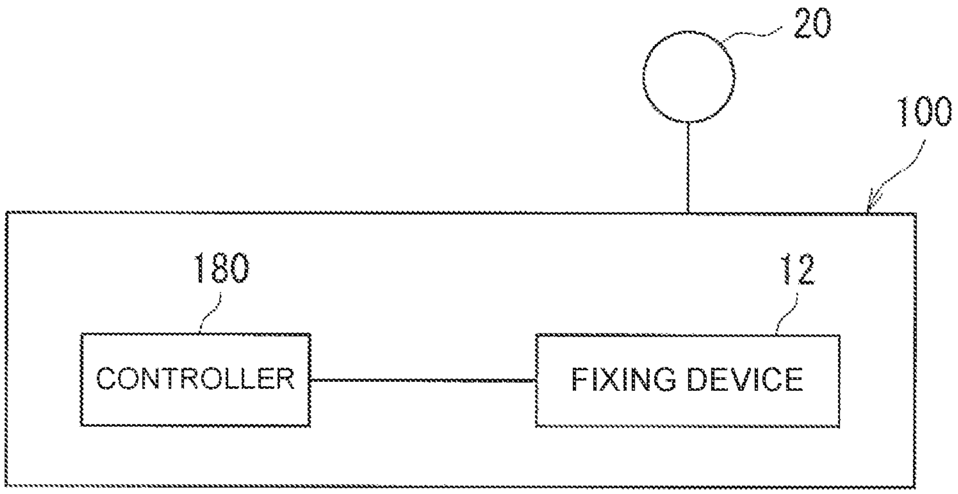
FIG. 2 is a block diagram schematically illustrating control configuration related to a fixing device in the image forming apparatus according to the embodiment of the present disclosure.
Figure 3:
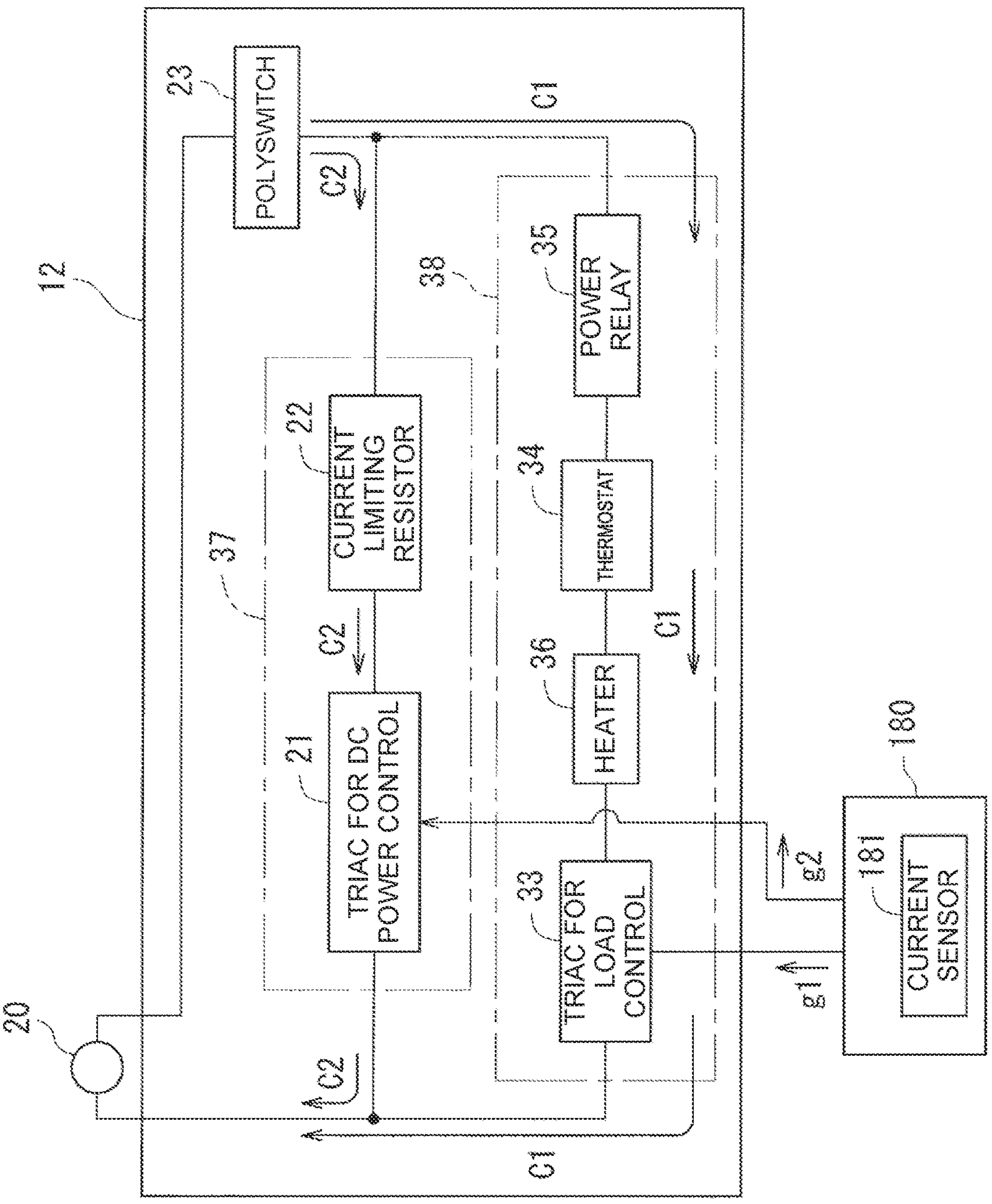
FIG. 3 is a block diagram schematically illustrating control configuration related to a heater of the fixing device in the image forming apparatus according to the embodiment of the present disclosure.

FIG. 2 is a block diagram schematically illustrating control configuration related to the fixing device in the image forming apparatus according to the embodiment of the present disclosure. FIG. 3 is a block diagram schematically illustrating the control configuration related to the heater of the fixing device in the image forming apparatus according to the embodiment of the present disclosure.

As shown in FIG. 2, the image forming apparatus 100 is connected to a power source 20. The power source 20 is, for example, a power conditioner for solar power generation that supplies power obtained by the solar power generation. As described above, the image forming apparatus 100 is driven by an AC power source. The power source 20 converts the DC power obtained by the solar power generation to AC power and supplies it to the image forming apparatus 100.

The image forming apparatus 100 includes a controller 180 that controls an operation of each member of the image forming apparatus 100. The controller 180 is constituted by using a CPU, a nonvolatile memory and the like, for example, and controls the operation of each member of the image forming apparatus 100. In addition, each member is operated upon receipt of instructions from the controller 180, and the controller 180 grasps an operating status of each member by signals from each member and the like and manages the operation of each member. Though details will be described below, the controller 180 outputs a signal g1 to a triac 33 for load control in order to control the temperature of the heater 36 (see FIG. 3). If the DC power from the power source 20 is input, the controller 180 outputs a signal g2 to a triac 21 for DC power control (see FIG. 3).

Each member of the image forming apparatus 100 operates using the AC power supplied by the power source 20 as a driving source. Though not shown in FIG. 2, as described above, the image forming apparatus 100 includes, in addition to the fixing device 12, the image transferor 50, the optical scanning device 1, the intermediate transfer belt device 70, the secondary transfer device 11, a motor that drives each of the rollers 13 to 17, and other members. Each of these members also operates on the basis of the AC power supplied to the power source 20.

As described above, the fixing device 12 has the fixing roller 31 and the pressure roller 32, and the heater 36 for heating the fixing roller 31 is disposed inside the fixing roller 31. As shown in FIG. 3, a circuit is formed for temperature control and overcurrent protection of this heater 36. The heater 36 is capable of emitting sufficient heat for heating the fixing roller 31 and fixing the toner image on the sheet P, and a resistance value and the like thereof differs for each model of the image forming apparatus 100. For example, the resistance value is selected so that a current of approximately 3 to 4 times of a rated current of the heater 36 flows.

As shown in FIG. 3, the fixing device 12 has the heater 36 and an AC circuit 38 having the triac 33 for load control, a thermostat 34, and a power relay 35 connected in series with the heater 36. An overcurrent operation circuit 37 is connected in parallel with the AC circuit 38. The overcurrent operation circuit 37 is configured such that the triac 21 for DC power control and a current limiting resistor 22 are connected in series. In addition, a polyswitch 23 is connected in series with the AC circuit 38 and the overcurrent operation circuit 37, and the AC power is supplied from the power source 20 to a circuit constituted by the AC circuit 38, the overcurrent operation circuit 37, and the polyswitch 23.

First, configuration of the AC circuit 38 will be described. The heater 36 is a heat source and generates heat by supply of electricity. Heat generation of the heater 36 heats the fixing roller 31, and when the sheet P passes between the fixing roller 31 and the pressure roller 32, toner (toner image) formed on the sheet P melts, and an image is formed by fixing of the toner image on the sheet P.

The triac 33 for load control controls the temperature of the heater 36. A triac is a switching element used to control an alternating current, is capable of causing a current to flow in bilateral directions, and it is turned on and conducts the current when a trigger signal is given to a gate terminal. When the conducting AC current becomes zero, it is turned off and the AC current is shut off.

For example, in a state where the AC power is supplied to a circuit constituted by connecting the load and the triac in series, time during which electricity is conducted to the load can be controlled by controlling timing of giving the trigger signal to the triac. In addition, since the triac is automatically turned off and shuts off the current when the current being conducted reaches zero, there is no need to provide signals at either of on and off timing. However, when the DC current is caused to flow to the triac, unlike AC, the current is constant and does not go to zero and thus, such a state occurs that once the triac is turned on by giving a trigger signal to the triac, it would not be turned off, and the current continues to flow.

The triac 33 for load control receives an input of a signal g1 for controlling the heater 36 from the controller 180, and when the signal g1 is input to the triac 33 for load control, the triac 33 for load control is turned on, and an AC current flows in the heater 36. When the AC current reaches zero, the triac 33 for load control is turned off, and no AC current flows in the heater 36 even if the AC current increases thereafter.

The thermostat 34 has a function of detecting a temperature and shutting off energization by disconnecting a contact when the detected temperature exceeds a predetermined temperature. Specifically, if the temperature in the vicinity of the heater 36 rises too high and becomes an abnormal value, there is a concern that the heater 36 fails and thus, the thermostat 34 operates, and the contacts are disconnected. As a result, the current to the heater 36 is shut off, and the heat generation of the heater 36 stops.

The power relay 35 has a function of detecting abnormalities in the power circuit used for control signals and of shutting off the energization by disconnecting the contact, if an abnormal value is detected. Specifically, if a voltage value or the like of the power supplied from the power source 20 becomes an abnormal value, the control signal becomes abnormal, and control abnormality is caused and thus, the power relay 35 operates, and the contact is disconnected. As a result, the current to the heater 36 is shut off, and the heat generation of the heater 36 stops.

The AC circuit 38 having the heater 36, the triac 33 for load control, the thermostat 34, and the power relay 35 operates normally by the AC power source. If DC power is input to the AC circuit 38, the current of a constant value flows, and the current will never be zero as in the case of AC. As a result, control of the heater 36 by the triac 33 for load control becomes impossible, and the operation of the heater 36 becomes abnormal.

In addition, if a DC current flows through the thermostat 34 and the power relay 35, there is a possibility that each contact of the thermostat 34 and the power relay 35 melts due to arc discharge. If these contacts melt, the contacts are not disconnected but a short-circuit state is maintained and thus, the current to the heater 36 is not shut off.

In other words, the AC circuit 38 operates normally when the AC power is input, and even if an abnormality occurs, the thermostat 34 or the power relay 35 shuts off the current to properly protect the heater 36 from an abnormal operation, but if the DC power is input, there is a possibility that they do not operate normally and moreover, they are not properly protected.

Next, configuration of the overcurrent operation circuit 37 will be described. Since the triac 21 for DC power control is a triac, once it is turned on, it will not be turned off when the DC current is flowing, as described above. The triac 21 for DC power control is turned on and electrically conducted when the signal g2 is input from the controller 180. When the DC power is input from the power source 20, the controller 180 senses that the DC power is supplied from the power source 20 and outputs the signal g2 to the triac 21 for DC power control.

Here, the controller 180 has a current sensor 181 by a Hall element. The current sensor 181, not shown, scales down an output waveform from the power source 20 and inputs it to a CPU (not shown) of the controller 180. It is only necessary to configure that the CPU detects which of AC or DC the output waveform from the power source 20 is. If it is detected that the output waveform from the power source 20 is DC, the controller 180 outputs the signal g2.

In order to detect that the DC power is output from the power source 20, other methods other than the current sensor 181 by the Hall element may be used. For example, such a sensing circuit may be included that, by using an electronic element, a zero-crossing signal of the output from the power source 20 is detected, and when the zero-crossing signal is not detected, it is sensed that the DC power is output. The detection circuit as above may, for example, use a photocoupler.

The current limiting resistor 22 is a resistor having a sufficiently low resistance value as compared with the heater 36. The current limiting resistor 22 preferably has voltage resistance and may use a cement resistor, for example. A resistance value of the cement resistor is, for example, 0.5Ω, which is sufficiently low as compared with the resistance value of the heater 36.

Next, the polyswitch 23 will be described. The polyswitch 23 is an overcurrent protection element that shuts off the current if a current exceeding a predetermined current value flows. In addition, the polyswitch 23 can be used repeatedly because it can cancel the shut-off and cause the current to flow again, if the temperature drops after the current was shut off. The overcurrent is, for example, 20A to 30A. In other words, if a current of 20A or more is to flow through the polyswitch 23, the polyswitch 23 shuts off the current.

In the fixing device 12, an operation of the circuit constituted by the AC circuit 38, the overcurrent operation circuit 37, and the polyswitch 23 will be described.

First, in a normal state, the AC power is supplied to the image forming apparatus 100 from the power source 20. In this state, the signal g2 is not input to the triac 21 for DC power control, and the triac 21 for DC power control is in an off state. Therefore, the AC current flows through a path C1 of the polyswitch 23, the power relay 35, the thermostat 34, the heater 36, and the triac 33 for load control, and the current does not flow through the triac 21 for DC power control or the current limiting resistor 22. In this state, the controller 180 controls the temperature of the heater 36 by outputting the signal g1 to the triac 33 for load control.

However, if the DC power is supplied from the power source 20 due to a nonconformity of the power source 20, the DC power is supplied to the image forming apparatus 100 from the power source 20. In this case, the current sensor 181 senses that the DC power is supplied from the power source 20, and the controller 180 outputs the signal g2 to the triac 21 for DC power control. When the signal g2 is input to the triac 21 for DC power control, the triac 21 for DC power control is turned on, and the current flows through the triac 21 for DC power control and the current limiting resistor 22. In other words, the current flows in a path C2. In addition, the current input to the triac 33 for load control does not reach zero and thus, the current continues to flow also in the path C1. In other words, the current flows in the paths C1 and C2.

Therefore, the current flows through the circuit configured such that the overcurrent operation circuit 37 and the AC circuit 38 are in parallel, and the polyswitch 23 is connected to them in series. Here, since the resistance value of the current limiting resistor 22 is sufficiently small as compared with that of the heater 36, the current flowing in the path C2 is larger than that in the path C1. Furthermore, when the AC power is supplied from the power source 20, the current flew to the heater 36 side due to the shut-off by the triac 21 for DC power control, but when the triac 21 for DC power control is turned on, and the current flows in the circuit in which the overcurrent operation circuit 37 and the AC circuit 38 are in parallel, a current larger than that in a state of flowing only to the AC circuit 38 flows to the polyswitch 23. As a result, a current (overcurrent) at a predetermined value or more flows in the polyswitch 23, whereby the polyswitch 23 is shut off.

Figure 4:
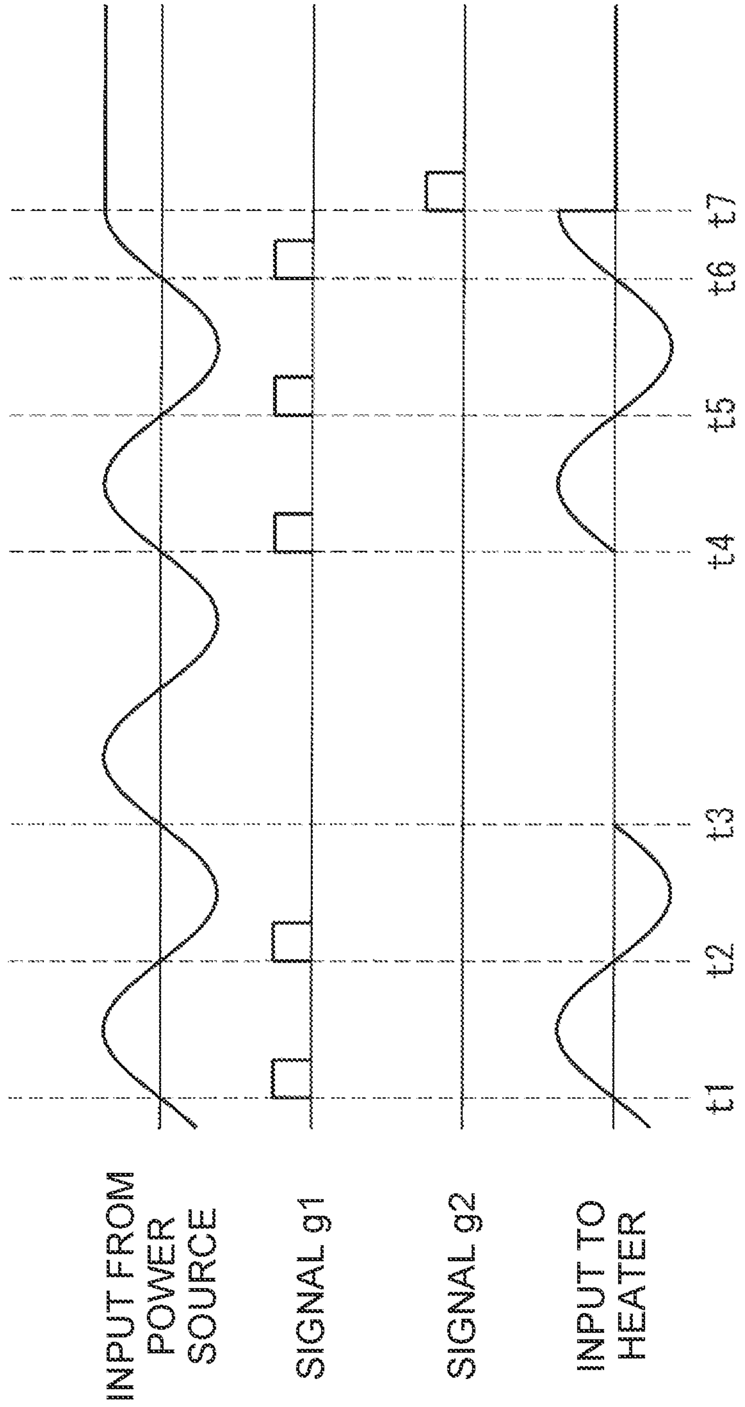
FIG. 4 is a timing chart for illustrating an example of an operation of the heater or the like of the image forming apparatus according to the embodiment of the present disclosure.

The aforementioned operation will be explained by using the drawings. FIG. 4 is a timing chart for illustrating an example of an operation of a heater or the like of the image forming apparatus according to the embodiment of the present disclosure.

In FIG. 4, a period from time t1 to time t7 is a normal operation, and AC power is supplied from the power source 20. Then, at the time t7, the DC power is supplied from the power source 20 for some reason, and it is such a state where the DC power is continuously supplied from the power source 20 thereafter.

The controller 180 executes temperature control of the heater 36, and at the time t1, the signal g1, which is a pulse signal, is output to the triac 33 for load control. When the signal g1 is input to the triac 33 for load control, the triac 33 for load control is turned on and remains on until time t2 when the AC current flowing through the triac 33 for load control becomes zero. Through the triac 33 for load control and the heater 36, an AC current with the same waveform as that of the AC power supplied from the power source 20 flows.

As described above, an AC current flows in the heater 36 from the time t1 to the time t2. Here, if the signal g1 is not input to the triac 33 for load control at the time t2, the triac 33 for load control is turned off at the time t2, but the controller 180 outputs another signal g1 at the time t2 and thus, the triac 33 for load control remains in the ON state and the AC current continuously flows in the heater 36. Then, the ON state is maintained until time t3, when the AC current flowing in the triac 33 for load control becomes 0 again. As a result, the AC current flows continuously also in the heater 36 until the time t3. Therefore, the heater 36 continues to generate heat from the time t1 to the time t3. Then, since the controller 180 does not output the signal g1 at the time t3, the triac 33 for load control is turned off, and the current flowing in the heater 36 becomes 0.

At time t4, the controller 180 outputs the signal g1, but until then (period of time from the time t3 to the time t4), no current flows in the heater 36, and the heat generation of the heater 36 stops. By controlling the output of the signal g1 in this manner, the controller 180 controls the heat generation and stop of the heater 36 and controls the temperature of the heater 36.

The controller 180 outputs the signal g1 at the time t4 and also at time t5 and time t6 when the AC current flowing through the triac 33 for load control becomes zero and thus, the AC current continuously flows in the heater 36.

Note that, from the time t1 to time t7, the triac 21 for DC power control is not turned on and thus, the AC current flows only in the path C1 and not in the path C2.

Then, when the DC power is supplied from the power source 20 at the time t7, the current flowing in the triac 33 for load control becomes a constant value similarly to the DC power supplied from the power source 20. However, when the current sensor 181 detects that the DC power is being supplied from the power source 20, the controller 180 outputs the signal g2 to the triac 21 for DC power control. When the signal g2 is input to the triac 21 for DC power control, the triac 21 for DC power control is turned on. As a result, the DC current flows not only in the path C1 but also in the path C2.

When the current flows in the path C1 and the path C2, a value of the current flowing in each of the path C1 and the path C2 is determined in accordance with a resistance value of each of the AC circuit 38 and the overcurrent operation circuit 37. As described above, since the resistance value of the current limiting resistor 22 is sufficiently large as compared with the resistance value of the heater 36, the value of the current flowing in the overcurrent operation circuit 37 (the value of the current flowing in the path C2) is extremely larger than the value of the current flowing in the AC circuit 38 (the value of the current flowing in the path C1). In addition, the value of the current flowing in the path C2 is extremely large even as compared with a state where a current does not flow only in the path C1, which results in a flow of an overcurrent. The overcurrent activates the polyswitch 23, which shuts off the current flowing in the path C1 and the path C2. As a result, the current flowing in the heater 36 becomes 0, and the heat generation of the heater 36 stops.

As described above, when the DC power is supplied from the power source 20, the heat generation in the heater 36 stops, and such nonconformity that the heater 36 continues to generate heat and ignites or the like can be prevented.

Comparative Example

Figure 5:
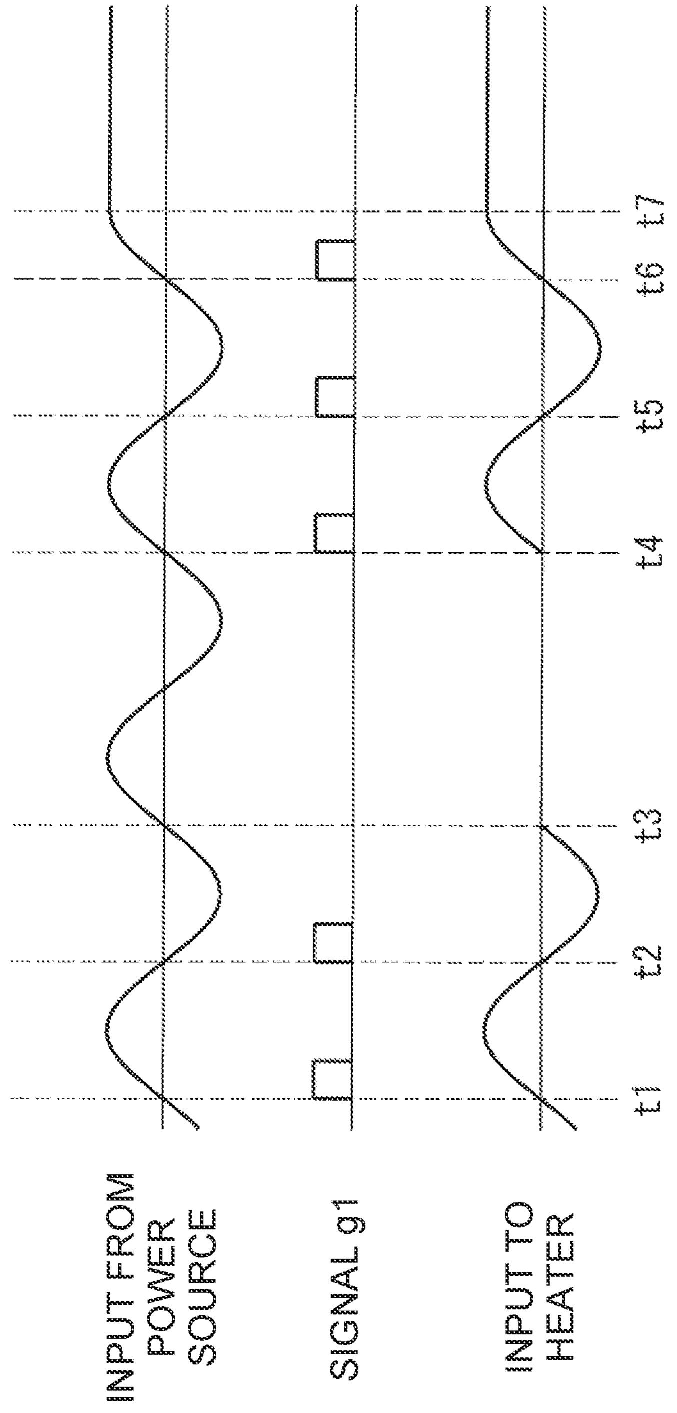
FIG. 5 is a timing chart for illustrating an example of an operation of the heater or the like of the image forming apparatus, which is a comparative example.

For comparison, an operation of the heater and the like of an image forming apparatus in a comparative example in which, unlike the present disclosure, the overcurrent operation circuit 37 is not provided, will be described by using the drawings. FIG. 5 is a timing chart for illustrating an example of an operation of the heater or the like of the image forming apparatus, which is a comparative example.

The image forming apparatus according to the comparative example does not have the overcurrent operation circuit 37 but has a circuit constituted by the polyswitch 23 and the AC circuit 38 connected in series, that is, a circuit not having the path C2 in this embodiment but constituted only by the path C1. The configuration other than that is similar to the configuration of the image forming apparatus 100 according to this embodiment 1. Thus, in the following description, the same members as those in this embodiment will be described with the same signs.

In the comparative example, the AC power is supplied from the power source 20 from the time t1 to the time t7 similarly to FIG. 4, and the DC power is supplied from the power source 20 at the time t7. As shown in FIG. 5, in the comparative example, too, the heater 36 operates normally from the time t1 to t7, when the AC power is supplied from power source 20.

As shown in FIG. 5, though it is similar to this embodiment from the time t1 to t7, when the DC power is supplied from the power source 20 at the time t7, the current flowing in the triac 33 for load control does not become 0 and thus, the triac 33 for load control is not turned off. Therefore, the current continuously flows in the heater 36 at the time t7 and after. In this case, the value of the current flowing in the heater 36 does not change significantly, and the overcurrent does not flow and thus, the polyswitch 23 does not operate, and the current is not shut off. Therefore, the current continues to flow in the heater 36, and the heater 36 continues to generate heat.

If the AC power from the power source 20 changes to the DC power, the power relay 35 detects this abnormality and is to disconnect the contact so as to shut off the current to the heater 36, but since the DC current is flowing in the power relay 35, there is a possibility that the contact of the power relay 35 melts due to arc discharge, and the contact is not disconnected, which results in a short-circuit state, and the current continues to flow in the heater 36.

If the heater 36 continues to generate heat after that, the thermostat 34 detects the abnormal temperature and is to disconnect the contact so as to shut off the current to the heater 36, but since the DC current is flowing, there is a possibility that the contact of the thermostat 34 melts due to arc discharge, and the contact is not disconnected, which results in a short-circuit state, and the current continuously flows in the heater 36.

As described above, when the DC power is supplied from the power source 20, the polyswitch 23, the thermostat 34, and the power relay 35, which are members for protecting the heater 36, do not function properly, the heater 36 continues to generate heat and eventually ignites, which causes problems.

As described above, according to the image forming apparatus 100 according to this embodiment, even if the power source 20, which normally supplies the AC power, supplies the DC power for some reason, the nonconformity that the heater 36 continues to generate heat can be prevented by shutting off the current flowing in the heater 36.

In place of the members such as each of the electronic components and the like in the aforementioned embodiment, members having similar functions may be used. For example, the configuration using the polyswitch 23 as a component for shutting off the current when an overcurrent occurs has been described, but that is not limiting, and it is also possible to replace the polyswitch 23 with other overcurrent protection components such as fuses. In addition, the triac 33 for load control and the triac 21 for DC power control execute control of the current flowing in the heater 36 and the current limiting resistor 22, respectively, but depending on degrees of these controls, they can be replaced by other components such as thermostats, power relays and the like.

In this embodiment, the resistance value of the current limiting resistor 22 is set to 0.5Ω, and the polyswitch 23 is configured not to carry the current at 20A or more. As described above, since the heater 36 differs for each model of the image forming apparatus 100, the current limiting resistor 22 and the polyswitch 23 with preferable values only need to be selected in accordance with the capacity of the heater 36 and the like used in the image forming apparatus 100.

The overcurrent for which the polyswitch 23 is to shut off the current only needs to be set as appropriate on the basis of the capacity of the heater 36 and the like. The resistance value of the current limiting resistor 22 only needs to be determined on the basis of the resistance value of the heater 36 and the like. In other words, when the triac 21 for DC power control is turned on and the parallel circuit of the overcurrent operation circuit 37 and the AC circuit 38 is constituted, it is only necessary to determine the resistance value of the current limiting resistor 22 so that an overcurrent flows to the overcurrent operation circuit 37. Then, it is only necessary that the polyswitch 23 that can shut off this overcurrent is selected.

Another Embodiment

The embodiment according to the present disclosure has been described above, but the present disclosure is not limited to the aforementioned embodiment. For example, the aforementioned embodiment was configured such that, in the image forming apparatus 100, when the AC power supplied from the power source 20 is changed to DC power, the heat generation of the heater 36 is stopped, but it may be so configured that other components in the image forming apparatus 100 that are operated by an AC power source stop when the DC power is supplied.

In addition, with respect to heaters operated by AC power in electrical equipment other than the image forming apparatus 100, it may be configured to stop when DC power is supplied, or components other than the heater may be configured to stop.

The present disclosure is not limited to the embodiments described above, but can be executed in various other forms. Thus, the embodiments are simply exemplification in all the aspects and should not be considered to be limiting. The scope of the present disclosure is indicated by the appended claims and is not bound in any way by the text of the specification. Moreover, all modifications and variations that come within the equivalent scope of the claims are within the scope of the present disclosure.

What is claimed is:

1. Electrical equipment including an alternating current (AC) circuit having a load and a load control member connected in series with the load in order to control the load, comprising:

an overcurrent operation circuit connected in parallel with the AC circuit and through which a current flows in a state where direct current (DC) power is suppliable to the AC circuit; and an overcurrent breaker connected in series with the AC circuit and the overcurrent operation circuit, wherein the overcurrent breaker shuts off the current when an overcurrent flows in the overcurrent operation circuit.

2. The electrical equipment according to claim 1, wherein the overcurrent operation circuit has a current-limiting resistor that has a resistance value lower than the load and a DC power operation supplier that is connected in series with the current-limiting resistor and is electrically conducted in a state where the DC power is suppliable to the AC circuit.

3. The electrical equipment according to claim 2, wherein the DC power operation supplier is a triode for alternating current (triac) that is turned on in a state where the DC power is suppliable to the AC circuit.

4. The electrical equipment according to claim 1, wherein the load is a heater that forms an image on a recording medium by thermally fixing a toner image formed on the recording medium.

5. The electrical equipment according to claim 2, wherein the load is a heater that forms an image on a recording medium by thermally fixing a toner image formed on the recording medium.

6. The electrical equipment according to claim 3, wherein the load is a heater that forms an image on a recording medium by thermally fixing a toner image formed on the recording medium.

7. An image forming apparatus that forms a toner image on a recording medium and forms an image on the recording medium by fixing the toner image formed on the recording medium, the image forming apparatus comprising:

an AC circuit having a heater, which is a load that thermally fixes the toner image formed on the recording medium, and a load control member that is connected in series with the heater in order to control the heater;

an overcurrent operation circuit that is connected in parallel with the AC circuit and through which a current flows in a state where DC power is suppliable to the AC circuit; and an overcurrent breaker that is connected in series with the AC circuit and the overcurrent operation circuit, wherein the overcurrent breaker shuts off the current by flow of an overcurrent through the overcurrent operation circuit.

* * * * *